United States Patent
Lee et al.

(10) Patent No.: US 9,178,973 B2
(45) Date of Patent: Nov. 3, 2015

(54) AUDIO CONTROL SYSTEM AND METHOD USING NEAR-FIELD WIRELESS COMMUNICATION

(75) Inventors: Gwang-Hui Lee, Gyeongsangbuk-do (KR); Min-Soo Kim, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 628 days.

(21) Appl. No.: 13/171,795

(22) Filed: Jun. 29, 2011

(65) Prior Publication Data

US 2011/0319017 A1    Dec. 29, 2011

(30) Foreign Application Priority Data

Jun. 29, 2010  (KR) .................. 10-2010-0061706

(51) Int. Cl.
*H04M 1/64* (2006.01)
*H04M 1/60* (2006.01)
*H04M 1/725* (2006.01)

(52) U.S. Cl.
CPC .......... *H04M 1/6066* (2013.01); *H04M 1/6091* (2013.01); *H04M 1/7253* (2013.01); *H04M 2250/02* (2013.01); *H04M 2250/12* (2013.01)

(58) Field of Classification Search
USPC ......... 455/41.1, 550.1, 558, 550, 3.04, 414.1, 455/412.1, 412.2, 427, 566, 3.01, 3.02, 3.03
See application file for complete search history.

(56) References Cited

U.S. PATENT DOCUMENTS

| | | | | |
|---|---|---|---|---|
| 4,348,550 A | * | 9/1982 | Pirz et al. ................. | 379/355.06 |
| 4,385,359 A | * | 5/1983 | Watari et al. .................. | 704/231 |
| 5,239,586 A | * | 8/1993 | Marui ........................... | 704/270 |
| 6,101,381 A | * | 8/2000 | Tajima et al. .............. | 455/414.2 |
| 7,158,753 B2 | * | 1/2007 | Kagan et al. ................. | 455/3.04 |
| 2002/0039909 A1 | * | 4/2002 | Rankin ........................ | 455/558 |
| 2003/0076968 A1 | * | 4/2003 | Rast ............................. | 381/124 |
| 2007/0232222 A1 | * | 10/2007 | de Jong ....................... | 455/3.06 |
| 2010/0048127 A1 | * | 2/2010 | Stucki et al. ................. | 455/41.1 |
| 2010/0099354 A1 | * | 4/2010 | Johnson ....................... | 455/41.1 |
| 2010/0106801 A1 | * | 4/2010 | Bliss et al. ................... | 709/219 |

FOREIGN PATENT DOCUMENTS

| WO | 00/74350 A2 | 12/2000 |
|---|---|---|
| WO | 02/13555 A2 | 2/2002 |

* cited by examiner

*Primary Examiner* — Ganiyu A Hanidu
(74) *Attorney, Agent, or Firm* — Cha & Reiter, LLC.

(57) ABSTRACT

An audio control system using near-field wireless communication permits individualized audio data output to a plurality of devices with differing capabilities. The system preferably includes: a communication unit, which includes a near-field wireless communication transceiver and transmits and receives signal for acquiring address information and device information to and from at least one surrounding device; a car-kit capable of performing the near-field wireless communication, which is installed in a vehicle to which a tag storing vehicle information is attached; and a portable terminal for performing near-field wireless communication with the unit and the car-kit, recognizing the vehicle information by reading the tag installed in the vehicle equipped with the car-kit, and resetting an audio output corresponding to the vehicle information when audio data is output.

18 Claims, 3 Drawing Sheets

AUDIO CONTROL SYSTEM AND METHOD USING NEAR-FIELD WIRELESS COMMUNICATION

CLAIM OF PRIORITY

This application claims priority under 35 U.S.C. §119 from an application entitled "Audio Control System and Method Using Near Field Wireless Communication" filed in the Korean Intellectual Property Office on Jun. 29, 2010 and assigned Serial No. 10-2010-0061706, the contents of which are incorporated herein by reference in its entirety.

BACKGROUND OF THE INVENTION

1. Field of the Invention

The present invention relates generally to an audio control system and method using near field wireless communication to perform optimal tuning of a predetermined device performing an audio output.

2. Description of the Related Art

Recently, with regard to the development of technical fields associated with wireless communication, various technologies associated with the wireless communication have been developed and implemented, as technology using a wireless device or a wireless link has become a subject of great interest. Near-field wireless communication is widely used as a communication method having advantages of low cost and low power. A Bluetooth communication method, one of several near-field wireless communication methods, is a wireless communication method based on near-field radio technology. Since a Bluetooth module operates in an industry, science, and medical frequency band of a 2.4 GHz band, transmits voice and data in a speed of maximum 1 Mbps within a radius of 10 meters, and has a very low power consumption, there is a desire to increase an application range of the Bluetooth module.

The Bluetooth communication method is applied to various devices, e.g., computer peripheral devices, such as a monitor, a keyboard, and a mouse, wireless handsets, cellular phones, and wireless Local Area Networks (LANs), and is used for an information broadcasting service for providing various kinds of information through a Bluetooth device in a limited space.

FIG. 1 is a schematic configuration of a conventional Bluetooth communication system in which a portable terminal 101 equipped with a conventional Bluetooth module communicates with devices through Bluetooth communication.

Referring now to FIG. 1, when the portable terminal 101 operating as a master device in a Bluetooth communication network desires to output audio data, such as voice or music, through a wireless headset 110 or a Bluetooth car-kit installed in a vehicle 104, i.e., a surrounding device capable of performing Bluetooth communication, which is located within a predetermined range, since the portable terminal 101 cannot discriminatively recognize the wireless headset 110 or the Bluetooth car-kit even though the wireless headset 110 and the Bluetooth car-kit are set to their unique audio output levels, the same audio data based on audio output level setup parameters provided by default from the portable terminal 101 that is the master device is output regardless of the device-oriented unique audio output levels. Accordingly, it is difficult to meet sound quality suitable for a corresponding device through which the audio data is output when considering there are so many different devices with individualized optimum audio levels.

SUMMARY OF THE INVENTION

An object of the present invention is to provide advantageously an output of audio data with best sound quality suitable for a device through which the audio data is output by attaching a tag storing audio output level information to the device in a near-field wireless communication network. More particularly, the present invention recognizes an audio output level unique to the device by reading tag information from the device equipped with the tag, and resets an audio output to correspond to the unique audio output level.

According to one exemplary aspect of the present invention, there is provided an audio control system using near-field wireless communication, the audio control system preferably including: a unit, which includes a near-field wireless communication transceiver and transmits and receives signal for acquiring address information and device information to and from at least one surrounding device; a car-kit adapted for performing the near-field wireless communication, which is installed in a vehicle to which a tag storing vehicle information is attached (i.e. electronically coupled); and a portable terminal for performing near-field wireless communication with the unit and the car-kit, recognizing the vehicle information by reading the tag installed in the vehicle equipped with the car-kit, and resetting an audio output corresponding to the vehicle information when audio data is output.

According to another exemplary aspect of the present invention, there is provided an audio control method using near-field wireless communication, the audio control method preferably including: searching for a tag using a tag reader when an audio output is requested through the near-field wireless communication; if the tag is found, recognizing information stored in the tag by reading information regarding the tag and resetting an audio output to correspond to the stored information when audio data is output; and outputting the audio data by applying the audio output to a device to which the audio data is output through the near field wireless communication.

According to yet another exemplary embodiment of the present invention, the stored tag information identifies a device type of a particular surrounding device and the portable terminal retrieves remotely (i.e. via a base station, server, peer-to-peer) audio parameters associated with the particular surrounding device regarding one or more of noise, echo, and Auto Gain Control (AGC) for adjusting an audio output level according to the device type.

BRIEF DESCRIPTION OF THE DRAWINGS

The above and other exemplary objects, features and advantages of the present invention will become more apparent from the following detailed description when taken in conjunction with the accompanying drawing in which.

DETAILED DESCRIPTION

Preferred exemplary embodiments of the present invention will be described herein below with reference to the accompanying drawings. In the following description, although many specific items are shown, they are only provided to help general understanding of the present invention, and it will be understood by those of ordinary skill in the art that these specific items can be modified or changed within the scope of the present claims.

The present invention provides a portable terminal for broadcasting information to surrounding devices adapted for performing near-field wireless communication within a predetermined range through the near-field wireless communication or performing a communication service by controlling the surrounding devices and operating as a master device and proposes technology capable of performing optimal tuning of a predetermined device performing an audio output using the near-field wireless communication by reading tag information including a type of a device through which audio data is output and an audio output level unique to the device by using the near-field wireless communication and resetting an audio output to correspond to the read tag information when the audio data stored in a portable terminal is output through at least one surrounding device connected to the portable terminal through the near-field wireless communication in a network based on the near-field wireless communication.

In addition, the portable terminal according to a preferred exemplary embodiment of the present invention preferably comprises a mobile communication terminal equipped with a module adapted for performing near field wireless communication, and it will be clearly understood by those of ordinary skill in the art that the portable terminal according to the present invention may be applied to all types of information communication devices, such as a digital broadcast terminal, a Personal Digital Assistant (PDA), a smart phone, a third generation (3G) terminal, e.g., International Mobile Telecommunication 2000 (IMT-2000) terminal, a Wideband Code Division Multiple Access (WCDMA) terminal, a Global System for Mobile Communication Packet Radio Service (GSM/GPRS) terminal, and a Universal Mobile Telecommunication Service (UTMS) terminal, multimedia devices, and applications thereof.

An audio control system using near-field wireless communication according to a preferred exemplary embodiment of the present invention will now be described in detail with reference to FIG. 2.

Figure 1:
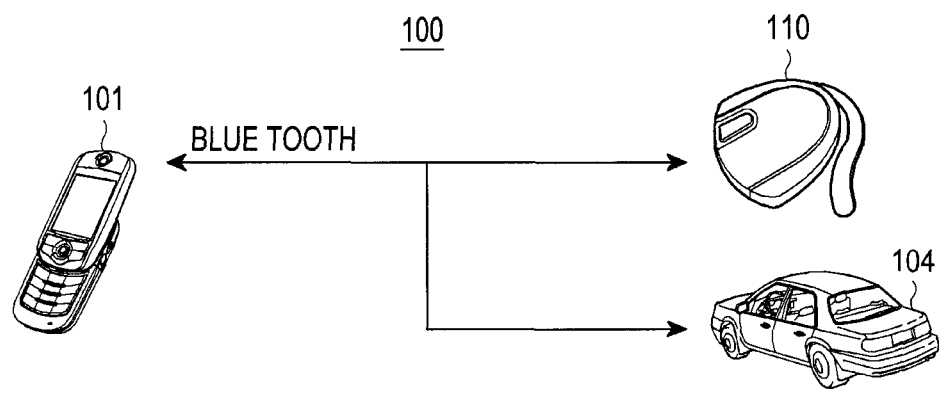
FIG. 1 is a schematic configuration of a Bluetooth communication system in which a portable terminal equipped with a conventional Bluetooth module communicates with devices through Bluetooth communication.
Figure 2:
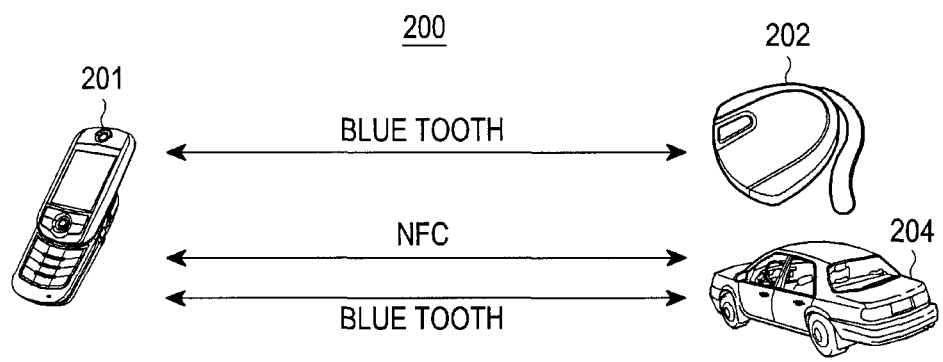
FIG. 2 is a schematic configuration of an audio control system using near field wireless communication according to a preferred exemplary embodiment of the present invention.

FIG. 2 is a schematic configuration of an audio control system 200 using near-field wireless communication according to a preferred exemplary embodiment of the present invention. Referring now to FIG. 2, the audio control system 200 preferably includes a portable terminal 201 operating as a master device, a unit 202 in communication with the portable terminal 201 through the near-field wireless communication, and a vehicle 204 equipped with a car-kit adapted to perform the near-field wireless communication.

The unit 202 may be any one of a hands-free and/or a headset capable of performing the near-field wireless communication with the portable terminal 201, various wireless communication modules capable of transmitting and receiving a signal by forming a communication channel in a near-field may be applied to the unit 202, and the unit 202 may include a near-field wireless communication transceiver and transmit and receive signals for acquiring address information and device information to and from at least one surrounding device.

Here, the near-field wireless communication may comprise, for example, any one of Bluetooth, Wireless Local Area Network (WLAN), Ultra Wideband (UWB), Infrared Data Association (IrDA), Zigbee, Radio Frequency Identification (RFID), and Near-Field Communication (NFC). However, although the near-field wireless communication is referred to as Bluetooth communication or NFC for convenience of description in the description of the present invention hereinafter, it will be understood by those of ordinary skill in the art that the present invention is not limited thereto, and the examples above a just a few possibilities.

The vehicle 204 may attach a tag storing vehicle information thereto and include a car-kit that is a car audio system capable of the near-field wireless communication. The car-kit may be installed in the vehicle 204 and output audio data of the portable terminal 201 for a Bluetooth communication service and audio data transmitted through the hands-free or headset of the unit 202.

Figure 4:
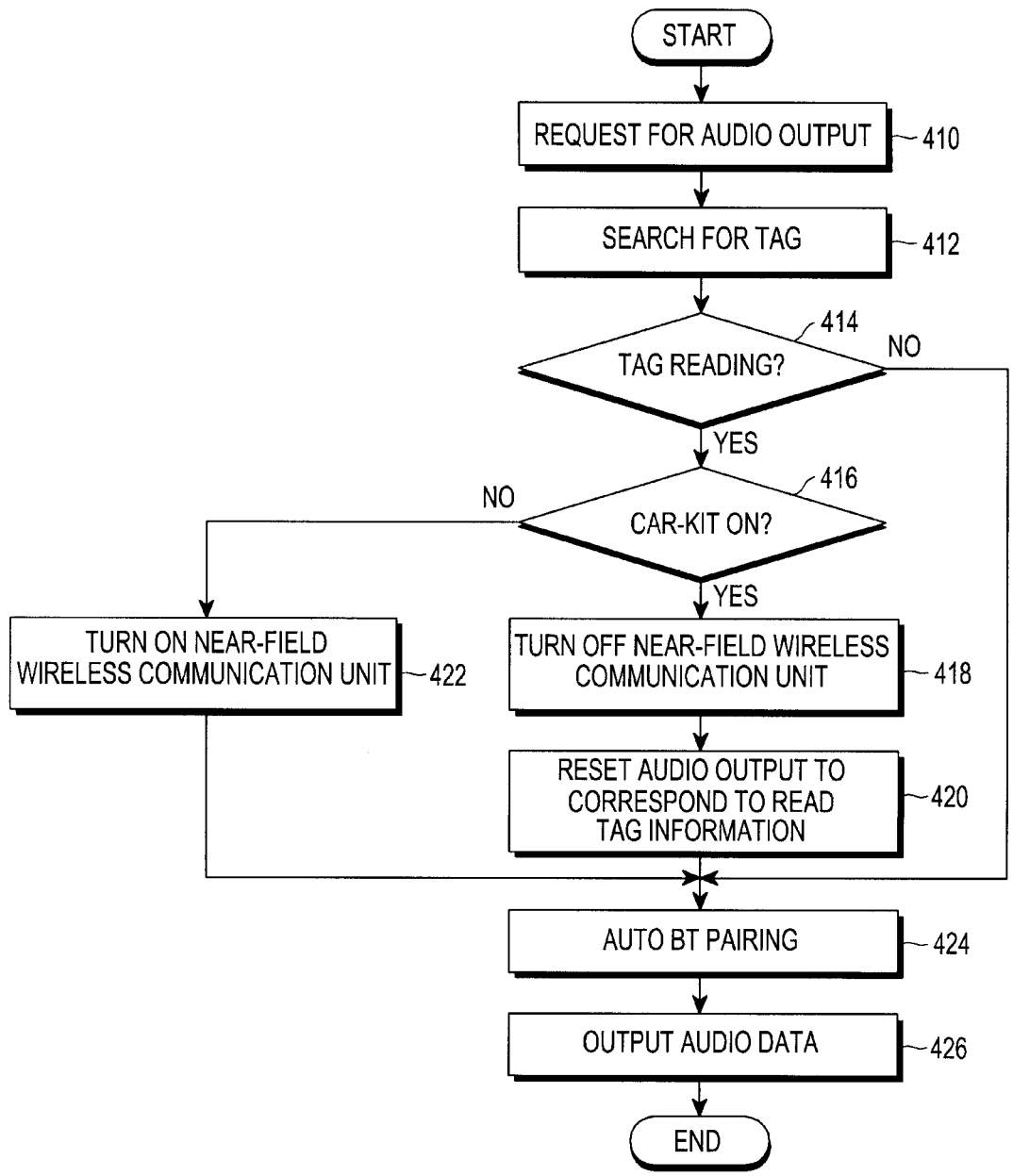
FIG. 4 is a flowchart of an audio control method using near field wireless communication according to a preferred exemplary embodiment of the present invention.

With continued reference to FIG. 4, the vehicle information may include a type of a device (meaning the car-kit adapted for performing the near-field wireless communication in the present invention) and audio output level information unique to the car-kit, i.e., parameters associated with noise, echo and Auto Gain Control (AGC), for adjusting an output level of the audio data when the audio data is output.

The portable terminal 201 preferably performs a series of operations for transmitting and receiving a control signal and a voice signal through a wireless interface with surrounding devices capable of Bluetooth communication or NFC, e.g., the unit 202 and the car-kit of the vehicle 204.

In addition, the portable terminal 201 may preferably include a tag reader (e.g., an NFC tag reader) for reading tag information from a device equipped with a Bluetooth module and a tag (e.g., an NFC tag), perform Bluetooth communication or NFC with the unit 202 and the car-kit of the vehicle 204, recognize the vehicle information by reading the tag attached to the vehicle 204 equipped with the car-kit, and reset an audio output corresponding to the vehicle information when the audio data is output.

The resetting of the audio output in the portable terminal 201 may be performed based on an audio parameter information table unique to each device type, which is stored in a memory of the portable terminal 201. For example, when tag information read by the portable terminal 201 through the tag reader indicates a car audio system, i.e., the car-kit, the tag information preferably includes information identifying that a device type is the car-kit and also may include the audio output level information, i.e., the parameters associated with noise, echo and AGC, in the car-kit.

In more detail, if the portable terminal 201 is operating as a master device when a near-field wireless communication service is performed and outputs audio data to slave devices, i.e., surrounding devices, connected thereto through the near-field wireless communication with audio output level setup parameters provided by default from the portable terminal 201 regardless of audio output levels of the surrounding devices, since the same audio data is output to the surrounding devices based on the audio output level setup parameters provided by default even though a different unique audio output level exists for each of the surrounding devices (e.g., a Moving Picture Experts Group Audio Layer-3 (MP3), a Personal Computer (PC), an audio system, and a car audio system), it is not easy to guarantee sound quality suitable for many of the surrounding devices.

In an exemplary aspect of the present invention, the portable terminal 201 preferably stores a unique audio parameter information table per surrounding device in the memory thereof and reset parameters of audio data to be output to be suitable for an audio output level of a surrounding device through which the audio data is output according to unique audio parameter information corresponding to tag information read by the tag reader.

In this particular case, when the portable terminal 201 desires to output audio data through a surrounding device, the portable terminal 201 may first determine whether an audio output level is to be reset according to tag information read from the surrounding device. If the tag information is read from the surrounding device through the near-field wireless communication when the portable terminal 201 desires to output the audio data through a particular surrounding device, the portable terminal 201 may reset an audio output level to correspond to the read tag information of the particular device. Otherwise, if the tag information is not read, the portable terminal 201 may perform pairing by forming a communication channel for Bluetooth communication without resetting the audio output level and output the audio data to the surrounding device through Bluetooth communication by performing a series of Bluetooth protocols.

Figure 3:
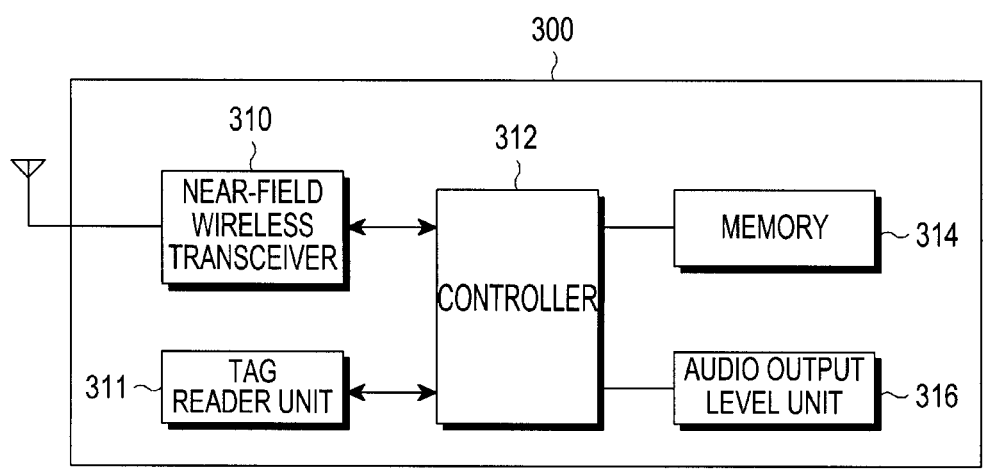
FIG. 3 is a block diagram of a portable terminal to which the present invention is applied.

FIG. 3 is a block diagram of a portable terminal 300 to which the present invention is applied. Referring now to FIG. 3, while the portable terminal 300 shown includes a near-field wireless transceiver 310, a tag reader unit 311, a controller 312, a memory 314, and an audio output level unit 316 in FIG. 3, the portable terminal 300 may further include a camera, a speaker, etc.

The near-field wireless transceiver 310 may transmit and receive signals for acquiring address information and device information of at least one surrounding device and deploy various wireless communication modules that transmit and receive a signal by forming a communication channel in a near-field.

In addition, the near-field wireless transceiver 310 may perform at least two of Bluetooth, WLAN, UWB, IrDA, Zigbee, RFID, and NFC communications, receive signals transmitted from the outside through the communications, and deliver the received signals to the controller 312.

The tag reader unit 311 may recognize presence of a tag from a device equipped with the tag, proceed to read tag information from the tag, and then output the read tag information to the controller 312.

The controller 312 typically controls a general operation of the portable terminal 300 and control the near-field wireless transceiver 310 to communicate with a surrounding device connected through near field wireless communication.

In addition, the controller 312 may preferably recognize predetermined information with respect to the tag information read by the tag reader unit 311 and control an audio output level to be reset in correspondence with the read tag information when audio data is output through surrounding devices.

Here, the resetting of the audio output level may be performed based on an audio parameter information table unique to each of device types, which is stored in the memory 314 of the portable terminal 300.

The memory 314 preferably stores programs and information required to operate the portable terminal 300. The memory 314 may also store an audio parameter information table unique to each of device types capable of outputting audio data according to a preferred exemplary embodiment of the present invention.

The audio output level unit 316 may perform "tuning" of audio data based on audio parameter information unique to a predetermined output device, which is input from the controller 312. In other words, the audio output level unit 316 may perform optimal tuning of various kinds of audio data by tuning audio parameters associated with noise, echo and AGC of corresponding audio data for which tuning has not been performed based on audio parameter information provided from the controller 312.

As described above, when audio data of the portable terminal 300 is output through a surrounding device using near-field wireless communication, the portable terminal 300 may perform an audio output optimal to a type of an audio device through which the audio data is output by reading tag information of a tag attached to the audio device and tuning an output level of the audio data in correspondence with the type and unique audio parameters of the particular audio device.

The audio control system 200 using near field wireless communication according to a preferred embodiment of the present invention and the portable terminal 300 to which the audio control system 200 is applied have been described.

Hereinafter, an audio control method using near field wireless communication according to a preferred embodiment of the present invention is described with reference to FIG. 4.

FIG. 4 is a flowchart of an audio control method using near field wireless communication according to a preferred embodiment of the present invention. Referring to FIG. 4, if a user requests that audio data stored in a portable terminal is output to a surrounding device by using the near field wireless communication in step 410, the portable terminal searches for a tag in a near-field from a position in which the portable terminal is located through a tag reader (e.g., an NFC tag reader) in step 412. For example, when the user of the portable terminal gets into a vehicle, the portable terminal determines through the tag reader thereof whether a tag (e.g., an NFC tag) is attached to the vehicle.

The portable terminal checks in step 414 whether or not predetermined tag information is read by the tag reader. As a result of the checking, if the tag information is read, it is determined in step 416 whether an audio output of an audio device through which the audio data is output is turned on or off, i.e., whether the status of an audio output based on noise, echo, and AGC is turned on or off.

As a result of the determination, if an audio output of a car-kit of the vehicle is turned on, the portable terminal turns an audio output of a unit connected to the car-kit through the near-field wireless communication off in step 418.

In step 420, the portable terminal resets an output of the audio data in correspondence with the read tag information. Here, the resetting of the audio data output is performed based on an already-stored audio parameter information table unique to each of device types. In other words, in the current embodiment, the portable terminal acquires an audio output level unique to the car-kit of the vehicle by reading the tag information of the vehicle and resets an audio output level transmitted by the portable terminal.

In step 424, the portable terminal performs pairing through Bluetooth communication with the car-kit through which the audio data stored in the portable terminal is output.

If Bluetooth communication is connected in step 424, the portable terminal outputs the audio data to meet the audio output level of the car-kit of the vehicle in step 426.

Meanwhile, as a result of the checking in step 414, if the tag information is not read, the portable terminal performs an audio output through Bluetooth communication in step 424 and moves to step 426. As a result of the determination in step 416, if the audio output of the car-kit of the vehicle is turned off, the portable terminal turns the unit connected to the car-kit on and moves to step 424 to perform operations thereafter.

According to the present invention, by reading tag information from a device equipped with a tag storing an audio output level, recognizing a type and the audio output level of the device through which audio data is output, and resetting an audio output level, the sound quality of an audio output of the device through which the audio data is output may be guaranteed.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

As described above, an audio control system and method using near-field wireless communication according to a preferred exemplary embodiment of the present invention may be achieved. While preferred exemplary embodiments of the invention have been described, various changes or modifications in form and details may be made therein without departing from the scope of the invention as defined by the appended claims and equivalents.

What is claimed is:

1. An audio control apparatus using near-field wireless communication in a portable terminal, the audio control apparatus comprising:
    a near-field wireless transceiver for performing near-field wireless communication with at least one of a communication unit of another audio apparatus and a car-kit, and
    a controller for recognizing a vehicle information by reading a tag installed in a vehicle equipped with the car-kit, resetting an audio output of audio data based on specific audio parameters included in the vehicle information and transmitting the audio data including the reset audio output to at least one of the communication unit and the car-kit though the near-field wireless communication,
    wherein the vehicle information read from the tag comprises a device type and audio parameters associated with one or more of noise, echo, and Auto Gain Control (AGC) for adjusting an audio output level.

2. The audio control apparatus of claim 1, wherein at least one of the communication unit and the car-kit remotely retrieves audio parameters associated with one or more of noise, echo, and Auto Gain Control (AGC) for adjusting an audio output level according to the device type.

3. The audio control apparatus of claim 1, wherein the resetting of the audio output is performed based on a unique audio parameter information table per device type, in which the audio parameter information table is stored in the portable terminal.

4. The audio control apparatus of claim 1, wherein, if the tag storing the vehicle information is read from a surrounding device when audio data is output, the portable terminal determines whether the audio output is reset according to an on/off status of an audio output of the surrounding device to which a tag storing the tag information is attached.

5. The audio control apparatus of claim 1, wherein the near-field wireless communication comprises any one of Bluetooth, Wireless Local Area Network (WLAN), Ultra Wideband (UWB), Infrared Data Association (IrDA), Zigbee, Radio Frequency Identification (RFID), and Near Field Communication (NFC).

6. The audio control apparatus of claim 1, in which the audio output is reset according to an on/off status of an audio output of a surrounding device to correspond to the vehicle information, is output to the car-kit through Bluetooth communication.

7. The audio control apparatus of claim 1, wherein the portable terminal broadcasts an inquiry signal for pairing with surrounding devices, receives an inquiry response signal from a particular surrounding device adapted for performing Bluetooth communication, and performs Bluetooth communication by connecting to the particular surrounding device from which the inquiry response signal has been received.

8. The audio control apparatus of claim 1, wherein Bluetooth communication between the portable terminal and the car-kit is performed after the portable terminal recognizes the vehicle information by reading the tag installed in the vehicle.

9. An audio control method using near field wireless communication, the audio control method comprising:
    searching by a tag reader unit for a tag associated with a surrounding device when an audio output request is received from the surrounding device via near-field wireless communication;
    upon the tag reader unit finding the tag, recognizing information by reading the tag and providing the information to a controller, and resetting by the controller an audio output of audio data by an audio output level unit based on specific audio parameter included in the information; and
    transmitting the audio data including the reset audio output to the surrounding device through the near-field wireless communication,
    wherein the tag information comprises a device type of the surrounding device and audio parameters associated with one or more of noise, echo, and Auto Gain Control (AGC) for adjusting an audio output level according to the device type.

10. The method according to claim 9, wherein the audio output request is received by a portable terminal that functions as a master device.

11. The audio control method of claim 9, wherein a portable terminal retrieves remotely audio parameters associated with the particular surrounding device regarding one or more of noise, echo, and Auto Gain Control (AGC) for adjusting an audio output level according to the device type.

12. The audio control method of claim 9, wherein the controller controls resetting of the audio output based on an already-stored unique audio parameter information table per device type retrieved from storage of a portable terminal.

13. The audio control method of claim 9, further comprising, if no tag is found, performing pairing for Bluetooth communication.

14. The audio control method of claim 9, further comprising, if the tag is found when an audio output is requested through the near-field wireless communication, determining whether the audio output is reset according to power on/off of the surrounding device to which the found tag is attached.

15. The audio control method of claim 9, wherein the near-field wireless communication comprises one of Bluetooth, Wireless Local Area Network (WLAN), Ultra Wideband (UWB), Infrared Data Association (IrDA), Zigbee, Radio Frequency Identification (RFID), and Near Field Communication (NFC).

16. The audio control method of claim 9, wherein the surrounding device comprises a car-kit module.

17. The audio control method of claim 10, wherein at least a second surrounding device comprises a headset in communication with the portable terminal.

18. An audio control apparatus using near-field wireless communication in a portable terminal, the audio control apparatus comprising:
- a near-field wireless transceiver for performing near-field wireless communication with at least one of a communication unit and an external audio device, and
- a controller for recognizing information from the external audio device by reading a tag installed in the external audio device, resetting an audio output of audio data based on specific audio parameters included in the external audio device information and transmitting the audio data including the reset audio output to at least one of the communication unit and the external audio device though the near-field wireless communication, wherein the specific audio parameters read from the tag include one or more of noise, echo, and Auto Gain Control (AGC) for adjusting an audio output level according to a device type.

* * * * *